Dec. 3, 1963  S. F. LETO  3,112,625
INSULATED SHAFT COUPLING DEVICE
Original Filed Dec. 6, 1960
FIG. 1
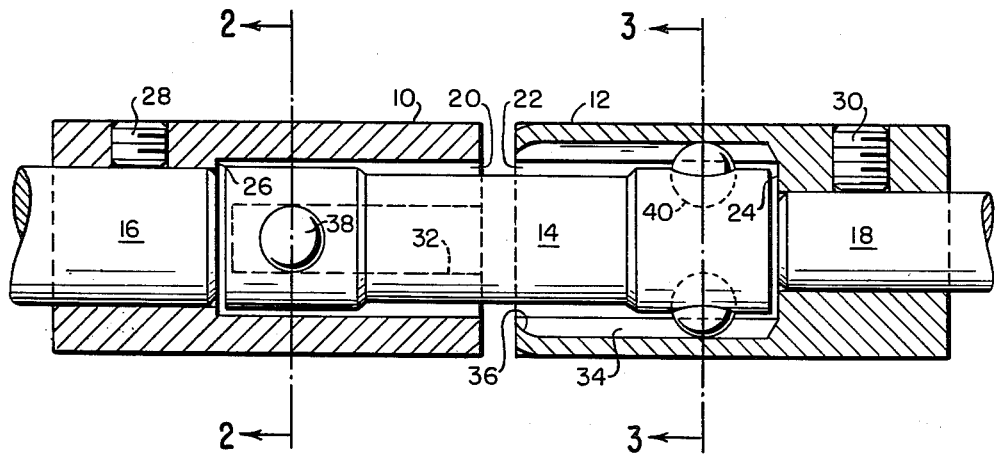
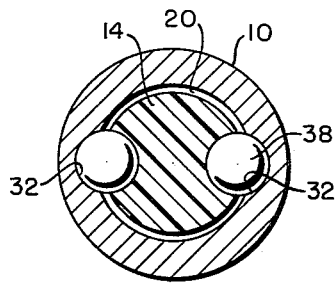
FIG. 2
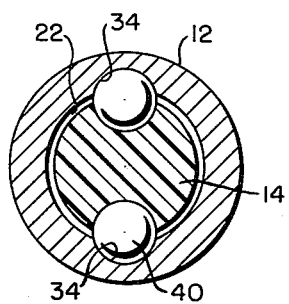
FIG. 3
INVENTOR.
SALVATORE F. LETO
BY
ATTORNEYS 3,112,625
INSULATED SHAFT COUPLING DEVICE
Salvatore F. Leto, 75 College Ave., Arlington, Mass.
Continuation of application Ser. No. 74,154, Dec. 6, 1960. This application July 20, 1962, Ser. No. 213,566
2 Claims. (Cl. 64—8)

This invention relates in general to drive couplings for transmitting rotational motion from one shaft to another, and more particularly concerns an electrically insulated flexible coupling which is free to move in axial translation and also able to accommodate slight axial misalignment between the shafts.

In certain applications, such as servo-drive systems, it is desirable to couple a pair of shafts which may be slightly misaligned axially or which rotate eccentrically. In many instances it is also desirable that the two shafts having driving connection and yet be electrically insulated one from another.

It is an object of the present invention to provide a novel coupling device of simple construction which may be used to transmit rotary motion from one shaft to another.

Another object of this invention is to provide a flexible coupling device for connecting a pair of rotatable shafts that are axially misaligned and at the same time electrically insulated from one another.

Yet another object of this invention is to provide a flexible, telescopic coupling device having inherently low back-lash characteristics.

More particularly, this invention features a coupling device having a pair of tubular hubs drivingly connected to one another by a plug. Opposite ends of the plug are pivotally mounted within each of the hubs and are arranged for limited sliding engagement therewith.

As another feature of this invention, the plug connecting the two hubs is fabricated from an electrical insulating material, such as nylon, and mounted in such a manner as to limit the longitudinal scope and thereby prevent the hubs from coming into direct contact with one another.

These and other features of the invention, along with further objects and advantages thereof, will become more readily apparent upon a detailed description of a preferred embodiment thereof with reference being made to the accompanying drawings, in which:

FIG. 1 is a longitudinal cross section of a coupling device made according to this invention;

FIG. 2 is a cross-sectional view taken along the line 2—2 of FIG. 1; and

FIG. 3 is a cross-sectional view taken along the line 3—3 of FIG. 1.

Referring now to the drawings, there is illustrated a coupling device in which a pair of tubular outer hubs 10 and 12 are held captive on opposite ends of a cylindrical plug 14. Each outer hub is in the form of a socket bored at one end to receive a shaft, as shown at 16 and 18, and recessed at its other end to form a center cylindrical chamber as at 20 and 22, terminating at its inner end in an annular shoulder as at 24 and 26. Both hubs may be made from stainless steel or the like and are radially tapped to receive set screws 28 and 30 for locking the hubs on their respective shafts. It will be observed in FIG. 1 that each hub is provided with an opposed pair of shallow grooves or raceways 32 and 34 which extend lengthwise along the walls of the cylindrical chamber and terminate at one end at the annular shoulders 24 and 26 and at the opposite end at an inwardly turned lip or stop 36. Preferably the pair of grooves for the hub 10 are oriented 90° about the coupling axis relative to the pair of grooves for the hub 12.

The plug 14 preferably is molded or machined from an electrical insulating high impact plastic material such as nylon, Teflon or the like and is formed with a reduced center portion and enlarged end portions. A pair of metal bearing balls 38 and 40 are seated 180° apart in the recesses near each end of the plug 14 with each pair being oriented at a 90° angle relative to one another.

The bearing balls are non-rotatably embedded in recesses provided for them in the enlarged end portions of the plug 14 and extend radially out from the surface of the plug to seat firmly in the grooves 32 and 34 with a minimum amount of play between the balls and grooves. The balls 38 and 40 are axially slidable along their grooves so that the coupling device may telescope to a certain extent and accommodate variations in the distance between the shafts which are to be connected. The lip 36, by engaging the balls 40, limits the outward extension of the coupling while the annular shoulders will butt against the ends of the plug 14 when the device is fully contracted and the central chamber nearly closed.

It is desirable that the hubs 10 and 12, which normally are formed from electrically conductive material, should not be allowed to contact one another at any time. To this end, the plug 14 has been made long enough so that the opposing inner ends of the two hubs will remain spaced from one another by more than the length of the plug even when the device is fully contracted.

From the description thus far, it will be obvious that the coupling device not only may telescope, but also may deflect within certain limits to accommodate misalignment between the shafts 16 and 18 or an eccentricity in the rotation of those shafts.

Limited flexibility is provided by means of the pivoted connection provided by the balls 38 and 40 between the hubs and the plug. The plug has an outside diameter somewhat smaller than the inside diameter of the cylindrical chambers 20 and 22 to define annular spaces between the plug and the inner walls of the chambers. Since the hub 10 is free to pivot about an axis normal to the plane of the paper in FIG. 1 and the hub 12 is free to pivot about the axis parallel with the plane of the paper, the coupling may accommodate any misalignment between the shafts 16 and 18 within the limits of the annular spaces between the plug and the inner walls of the hubs.

It will be understood that in the coupling device illustrated the plug and the hubs can pivot with respect to one another only within a relatively small angle because of the restrictions in space between the plug and the inner walls of the hubs. This angular movement could be increased to some extent by reducing the outside diameter of the plug so as to create additional space within which the parts may move.

The tolerances of the several members should be close enough to permit sliding movement of the balls in their grooves without play or binding. The nylon plug possesses a certain amount of resiliency and takes up whatever backlash that might exist.

It will be appreciated that the coupling device described herein has a simple yet rugged construction. The device may be produced quite inexpensively and lends itself to miniaturization. Although the invention has been described with particular reference to the illustrated embodiment, it will be obvious that certain modifications may be made. For instance, the bearing balls could be molded into nylon plug as hemispherical bosses if desired and different means may be taken to connect the hubs to their respective shafts.

The present application is a continuation of my co-pending application Serial No. 74,154, filed December 6, 1960, now abandoned, and entitled "Insulated Shaft Coupling Device."

Having thus disclosed my invention, what I claim and desire to secure by Letters Patent is:

1. A flexible, electrically non-conductive coupling, comprising a pair of tubular metal hubs bored for connection with shafts to be coupled, opening toward each other and together forming an elongated central chamber of substantially uniform dimensions from end to end, each of the said hubs having a pair of longitudinal grooves in the inner wall of the central chamber, said grooves being oriented 90° from each other about the longitudinal axis of the chamber and each terminated at its outer end by a radially extending lip, and a cylindrical plug of electrically non-conductive, resilient, plastic material located within the central chamber and being of greater length than the chamber and so preventing contact of the adjacent ends of the metal hubs, the plug having a central portion of reduced diameter and enlarged cylindrical ends containing balls arranged to slide in the longitudinal grooves of the hubs, said plug being restrained and located with respect to said hubs only by said balls.

2. A flexible coupling, comprising a pair of tubular metal hubs bored for connection with shafts to be coupled, opening toward each other and together forming an elongated central chamber of substantially uniform dimensions from end to end, each of the said hubs having a pair of longitudinal grooves in the inner wall of the central chamber, said grooves being oriented at an angle from each other about the longitudinal axis of the chamber and each terminated at its outer end by a radially extending lip, and a cylindrical plug located within the central chamber and being of greater length than the chamber and so preventing contact of the adjacent ends of the metal hubs, the plug having a central portion of reduced diameter and enlarged cylindrical ends containing balls arranged to slide in the longitudinal grooves of the hubs, said plug being restrained and located with respect to said hubs only by said balls.

References Cited in the file of this patent

UNITED STATES PATENTS

| | | |
|---|---|---|
| 2,360,786 | Miquelon | Oct. 17, 1944 |
| 2,437,785 | Mucher | Mar. 16, 1948 |
| 2,618,942 | Dodge | Nov. 25, 1952 |
| 3,020,736 | Babelay | Feb. 13, 1962 |